UNITED STATES PATENT OFFICE.

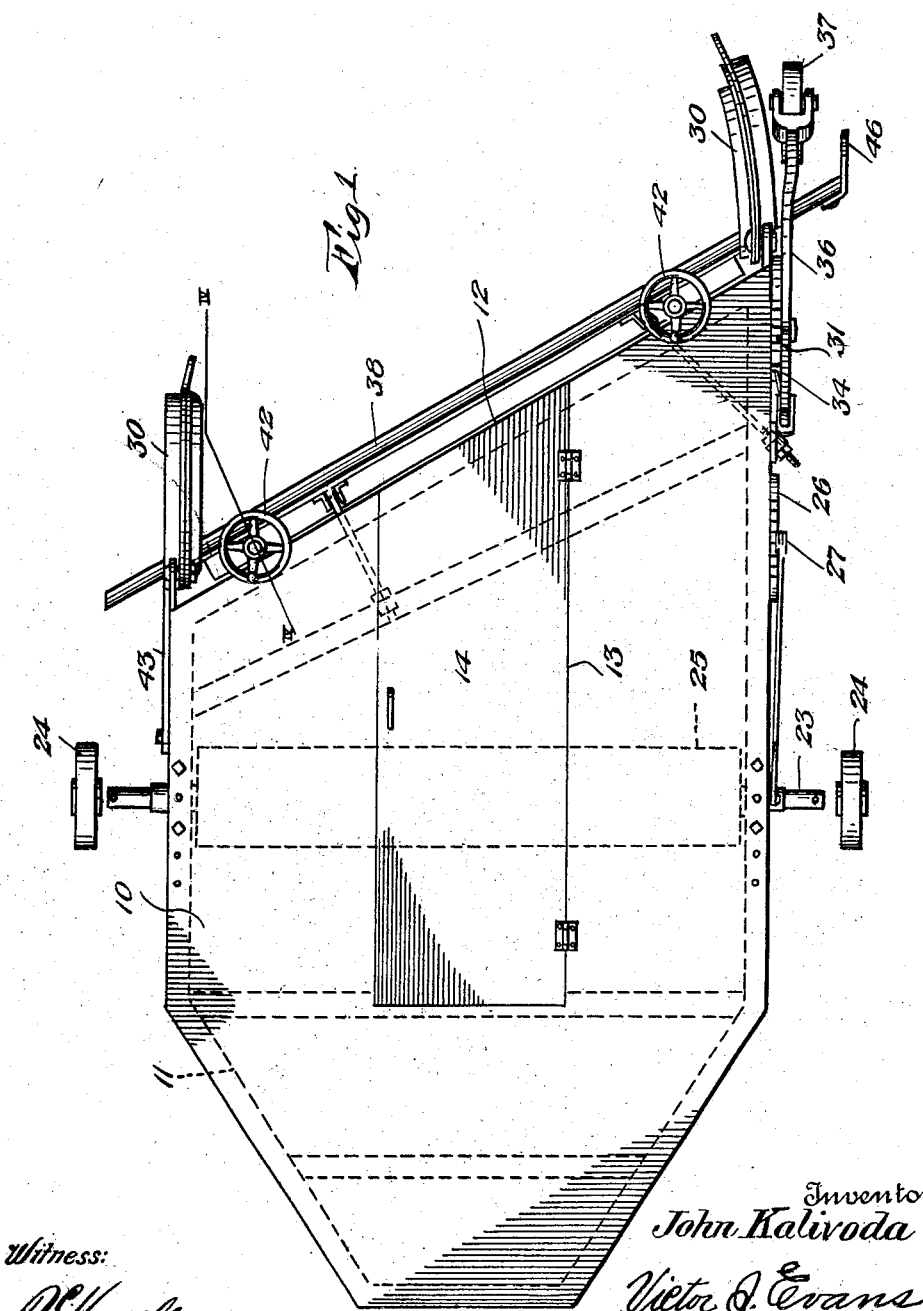

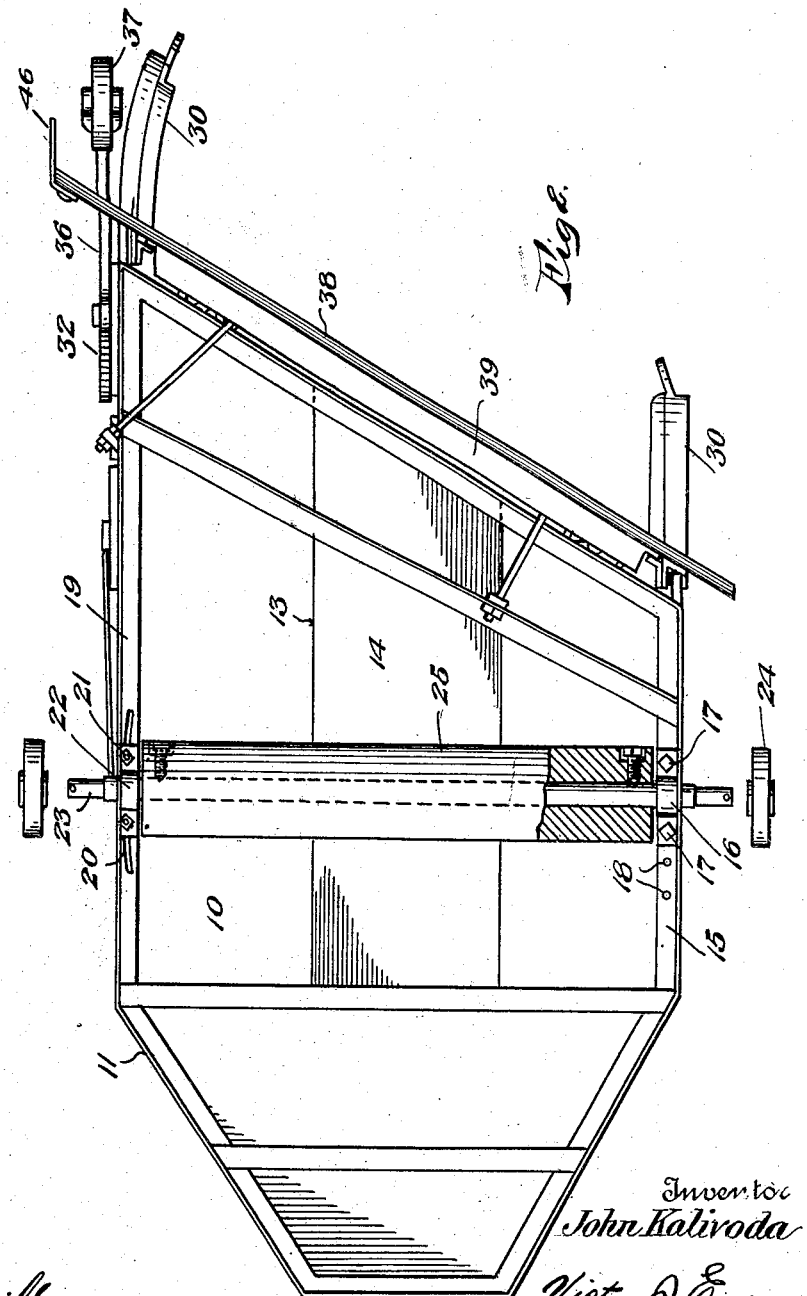

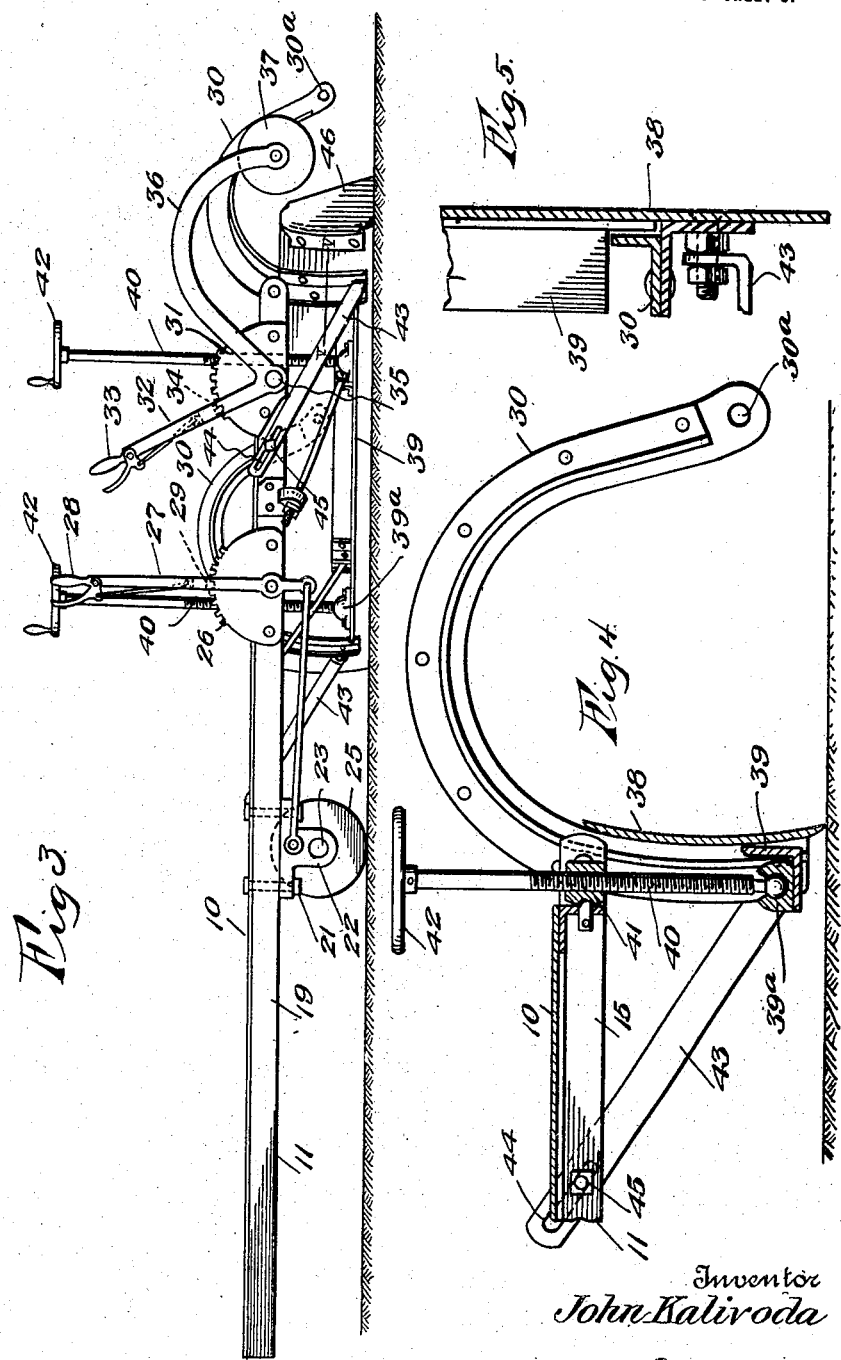

JOHN KALIVODA, OF CUBA, KANSAS.

ROAD DRAG OR SCRAPER.

1,426,992.  Specification of Letters Patent.  Patented Aug. 22, 1922.

Application filed February 5, 1921. Serial No. 442,717.

*To all whom it may concern:*

Be it known that I, JOHN KALIVODA, a citizen of the United States, residing at Cuba, in the county of Republic and State of Kansas, have invented new and useful Improvements in Road Drags or Scrapers, of which the following is a specification.

This invention relates to road building apparatus, particularly to road scrapers or drags and has for its object the provision of an improved device of this character including a roller which is capable of being adjusted in different angular positions depending upon the nature of the road upon which the device is used, novel means being provided for effecting such adjustment.

Another object is the provision of a device of this character which is provided with a guide wheel to the rear of which is mounted a reversible scraper blade held in position by specific adjusting means whereby its position may be varied when necessary.

An additional object is the provision of a device of this character which will be simple and comparatively inexpensive in construction, easy to use, very efficient in use, durable in service, and a general improvement in the art.

With the above and other objects and advantages in view, the invention consists in the details of construction to be hereinafter more fully described and claimed and illustrated in the accompanying drawings in which Figure 1 is a plan view of the device,
Figure 2 is a bottom plan view,
Figure 3 is a side elevation,
Figure 4 is a cross section on the line IV—IV of Figure 1, and
Figure 5 is a cross section on the line V—V of Figure 3.

Referring more particularly to the drawings, the numeral 10 designates a platform which is mounted upon a frame-work 11 formed preferably of angle iron of suitable size and shape. The major portion of this platform is rectangular while the rear extremity is trapezoidal. The forward edge of the main or rectangular portion of the platform is formed diagonal, as indicated at 12. The intermediate portion of the platform is formed with an opening 13 normally closed by a suitable trap door 14.

Disposed beneath one side bar 15 of the frame 11 is a bearing 16 which is held in place by suitable bolts 17 passing through selected ones of holes 18 so that its position may be varied. The opposite frame bar 19 is formed with a longitudinal slot 20 through which pass bolts 21 holding a bearing 22 which is slidable along the underside of the bar 19. The numeral 23 designates an axle carrying wheels 24 and carrying between the side bars 15 and 19, a roller 25.

In order that the position of the roller 25 may be varied as required, I provide a toothed segment 26 secured upon the frame bar 19 and having movable thereover a pivoted lever 27 having a hand grip 28 operating a pawl 29 engageable between teeth of the segment. By shifting the lever 27 in one direction or the other it will be observed that the bearing 22 may be slid along the bar 19 so as to vary the angular position of the roller 25.

Connected with the forward ends of the bars 15 and 19 are curved bars 30 having their forward ends provided with holes 30ª adapted for engagement by any suitable draft device for pulling the whole mechanism over the ground. Secured to the forward end of the frame bar 19 is a segment 31 over which moves a lever 32 having a hand grip 33 controlling a pawl 34 cooperating with the segment 31. Connected with the lever 32 at its pivot point 35 is a curved arm 36 which extends forwardly of the platform and which carries a guide roller 37 adapted to travel upon the ground.

The numeral 38 designates a concaved scraper blade which extends across the entire diagonal front end of the device and which is carried by an angle bar 39 which is for the purpose of limiting the depth of penetration of the blade 38 into the ground. Connected with the bar 39 by a ball and socket connection 39ª are upwardly extending screws 40 passing through nut members 41 on the frame and provided at their upper ends with hand wheels 42, this structure permitting vertical adjustment of the bar 39 together with the blade 38. The slant of the blade forwardly or rearwardly is controlled by means of brace rods 43 connected with the bar 39 and slotted at their rear ends, as shown at 44, for the passage of securing bolts 45. In order to dig or cut ditches, I provide an auxiliary angularly disposed blade 46 secured at the right end of the main blade 38, as clearly shown.

In the operation of the device it will be seen that it is drawn along the road by any suitable draft device which might be animals or a tractor. The blade 38 will of course scrape the ground to the desired depth and will slide it somewhat to one side to form the crown of the road. By manipulating the lever 27 the position of the roller 25 may be varied and the action of the roller is to flatten and press down the earth scraped up by the blade 38.

From the foregoing description and a study of the drawings it will be apparent that I have thus provided a simply constructed and very easily operated road scraping device which will very efficiently perform all the functions for which it is intended, which is easily adjustable in all its operating parts so as to meet various conditions.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

A device of the character described comprising a frame having an inclined forward edge, draft means carried by the frame and projecting forwardly beyond said inclined edge, a bar at the forward inclined edge of the frame, a plurality of upright screws threaded through said bar and provided at their upper ends with hand wheels, said screws having their lower ends formed with ball heads, a scraper blade disposed at said forward edge of the frame, a bar secured to the scraper blade and provided with sockets within which said ball heads are engaged, and upwardly and rearwardly inclined brace bars connected with the last named bar and having a slidable adjustment with respect to the sides of the frame.

In testimony whereof I affix my signature.

JOHN KALIVODA.